(No Model.)　　　　　　H. C. STILWELL.　　　3 Sheets—Sheet 1.
CASH INDICATOR AND REGISTER.
No. 462,106.　　　　　　　　　　Patented Oct. 27, 1891.
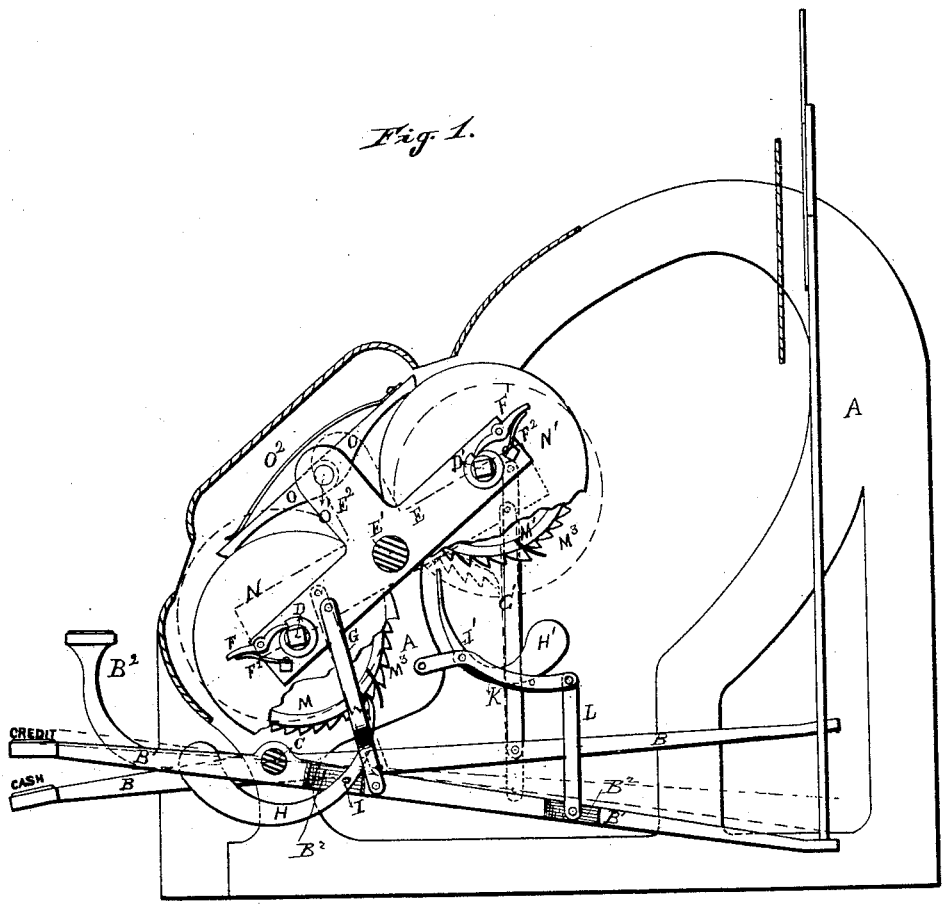
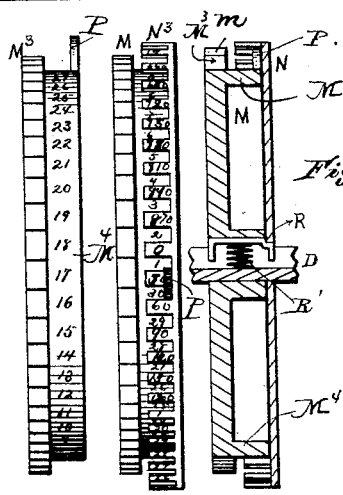
Attest.
John E. Wiles.
H. E. Whitaker.
Henry C. Stilwell
Inventor.
by
R. Mason
Atty.

(No Model.) 3 Sheets—Sheet 2.

H. C. STILWELL.
CASH INDICATOR AND REGISTER.

No. 462,106. Patented Oct. 27, 1891.

Attest.
John E. Wiles.
H. E. Whitaker

Inventor.
Henry C. Stilwell
by R. Mason
Atty.

(No Model.) 3 Sheets—Sheet 3.
H. C. STILWELL.
CASH INDICATOR AND REGISTER.
No. 462,106. Patented Oct. 27, 1891.
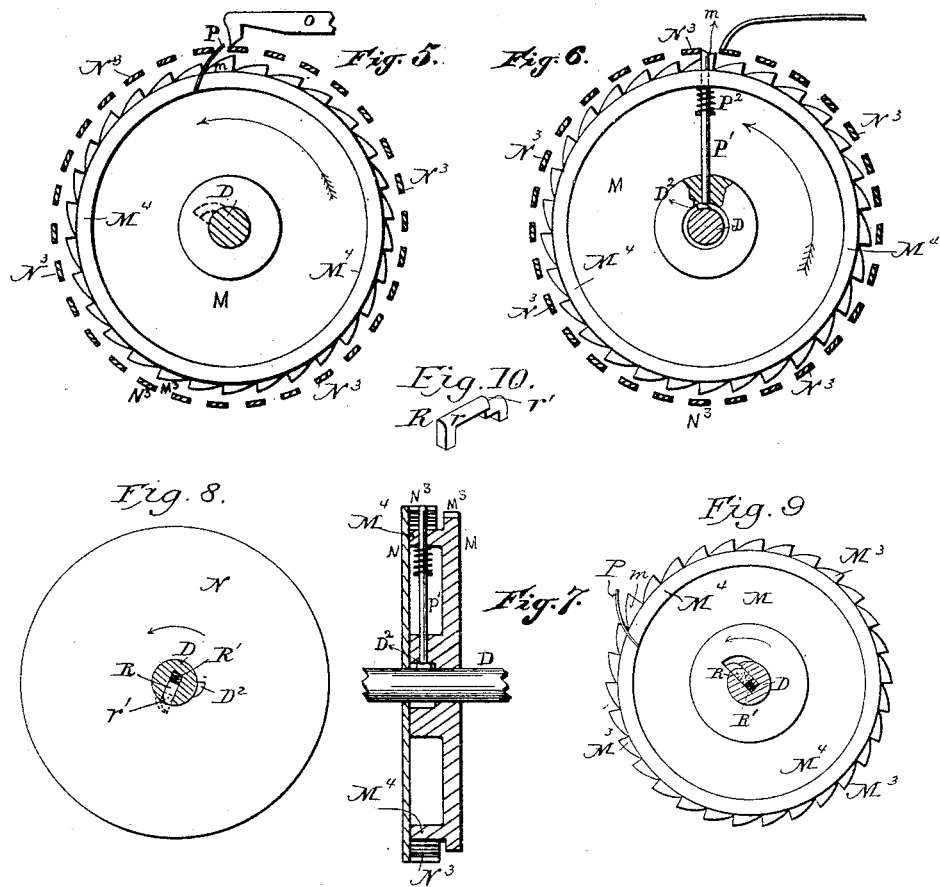
Attest.
John E. Wiles.
H. E. Whitaker.
Henry C. Stilwell
Inventor
by
R. Mason
Atty.

UNITED STATES PATENT OFFICE.

HENRY C. STILWELL, OF DAYTON, OHIO, ASSIGNOR OF ONE-HALF TO WILLIAM B. DENNIS, OF SAME PLACE.

CASH INDICATOR AND REGISTER.

SPECIFICATION forming part of Letters Patent No. 462,106, dated October 27, 1891.

Application filed February 26, 1889. Renewed April 23, 1891. Serial No. 390,093. (No model.)

*To all whom it may concern:*

Be it known that I, HENRY C. STILWELL, of Dayton, in the county of Montgomery and State of Ohio, have invented new and useful Improvements in Cash-Registers, of which the following is a specification.

The leading purpose of my invention is to provide a mechanical register whereby in one machine and by means of one set of keys records may be kept of different classes of sales—as, for instance, sales for cash and sales on credit—or an account kept of cash received and cash disbursed; and to this end my invention consists of a series of distinct registers, which may be thrown in and out of engagement alternately with the keys, so that only one set of registers shall be actuated at one time by the keys.

What I shall herein designate as a "register," for brevity, is a series of rotating wheels placed side by side on a single shaft and carrying on their peripheries figures to designate amounts. These wheels are arranged in couples connected together, so that one wheel shall designate consecutive numbers and the other wheel shall indicate the number of revolutions of the first wheel, so as to indicate multiples of the highest number indicated upon the first wheel. Thus the first wheel indicates the number of movements and its companion the multiples of the highest number on the first wheel.

In order to bring this register into its most compact form, the first wheel is cast with ratchets and a flange presenting a smooth surface, on which the numbers may be marked, and the second is formed of a disk of sheet metal notched at the periphery to form projections rectangular in form, and bent at right angles to lie parallel to the surface of the first wheel and of a larger diameter, so as to permit them to revolve outside thereof without contact with the points of the ratchet-cogs. This mode of constructing the register is another part of my invention, which consists, further, in minor combinations to be indicated hereinafter.

Figure 3:
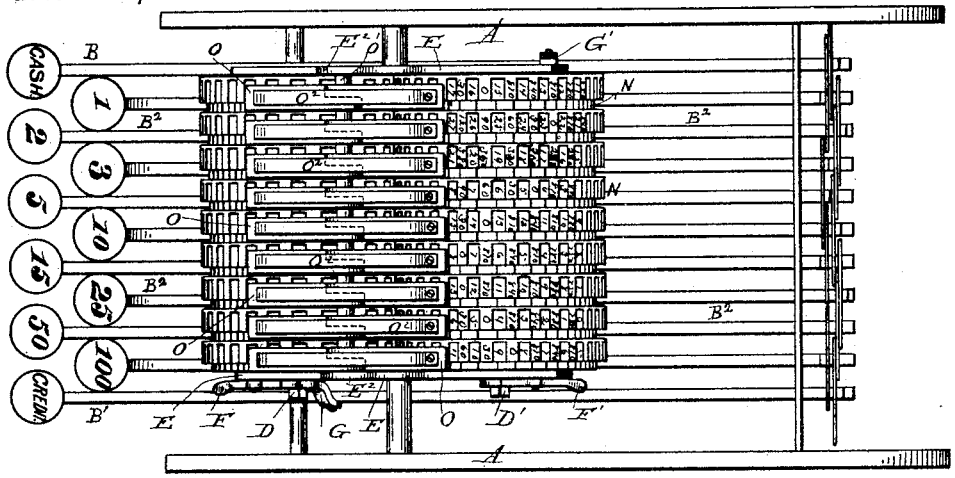
Figure 4:
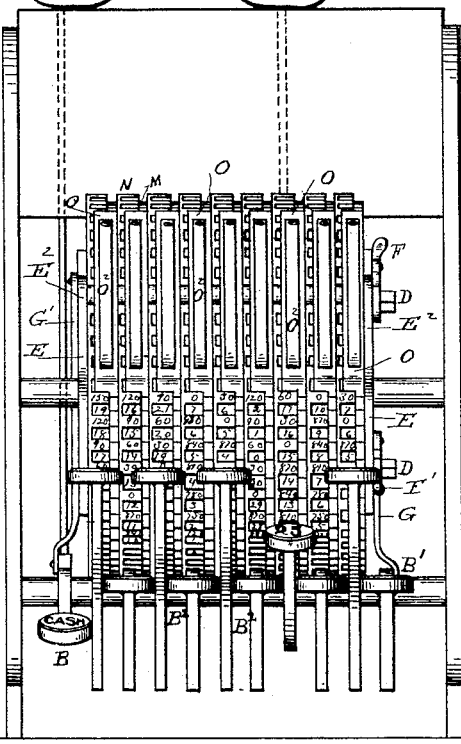

In the annexed drawings, making a part of this specification, Figure 1 is a sectional elevation of registering mechanism. Fig. 2 shows the first wheel in elevation and the two companion-wheels in elevation and in section. Fig. 3 is a plan view showing two registers and the keys. Fig. 4 is a front elevation showing the keys and the registers in the position indicated in Fig. 1. Fig. 5 is an elevation of the first wheel, showing the second in section. Fig. 6 is a similar elevation showing a different device for actuating the second wheel. Fig. 7 is a vertical section of the two wheels, showing the same device. Fig. 8 is a sectional elevation of the second wheel, shaft, and dog for bringing the wheel to zero. Fig. 9 is a similar sectional elevation of the first wheel, and Fig. 10 is a perspective view of the dog which engages both wheels.

The same letters are employed in all the figures in the indication of identical parts.

A is a cast-metal frame, of which there is one at each end, carrying the shafts upon which the operative mechanism is placed.

B is a key in the form of a lever, which has its fulcrum on the cross-shaft C at one end thereof, and B' another key at the other end. These in the cases illustrated are marked respectively "Cash" and "Credit," their function being to bring into engagement with the numbered keys, which are the operating-keys, one or the other of two distinct registers, one of which indicates the cash sales and the other the credit sales. Between these are arranged a series of numbered keys, of which there may be more or less, according to the character of the business which is to be registered. I have shown nine (9) such keys numbered respectively 1, 2, 3, 5, 10, 15, 25, 50, 100, by which amounts running from one cent to one dollar may be registered. Where the sales are of large sums, other operating-keys and mechanism may be added.

The registers form substantially two cylinders made up of rotating wheels revolving upon normally-fixed shafts D and D'. These shafts are carried upon bars E, which may be oscillated upon a fixed shaft E', Fig. 1.

$E^2$ is an arm projecting from the bar E. There is one of these bars E at each end of the registers and they carry the register-shafts D and D', the ends of which project on one side through the bar E and are formed, as shown in Fig. 1, with square ends to receive the socket of a turning key. (Not shown.)

Pawls F F' are pivoted to the ends of the bar E and are held by springs F² against a ratchet on the shafts D and D' to prevent their turning excepting in one direction. The bars E are oscillated upon their pivots E' by connecting-rods G and G', Fig. 1. The rod G connects one end of one of the bars E with the credit-key B', pivoted thereto at a point beyond the fulcrum. The other connecting-rod G' connects the other end of the other bar E with the cash-key B, being pivoted thereto at a point beyond its fulcrum. By this means either the credit or the cash register may be thrown into engagement with pawls H and H'. These pawls are in two series, respectively marked H and H'. The pawls H of one series are pivoted to the numbered keys B² at I. When the registering mechanism is in the position shown in Fig. 1, the pawls H engage respectively with the corresponding ratchet-wheels M, and when the position of the bar E is reversed the ratchet-wheels M' are brought into engagement with the pawls H', which are pivoted at I' to the levers K, pivoted to the frame A at one end and at the other to the connecting-rods L, which are pivoted to the numbered keys B², Fig. 1. Thus the same lever carries two pawls, one of which only is in engagement at one time with the corresponding ratchet-wheel. By this means one set of keys are made to operate either the cash or the credit register, according to their adjustment.

The register is made up of pairs of wheels M N and M' N'. The wheels M are cast with ratchet cogs or teeth M³ on their periphery, and with a smooth-surfaced flange M⁴, on which flange the serial numbers may be marked by stamping, painting, or in any other desired manner. These wheels M M' run freely on the shafts D and D'. With each wheel M and M' is connected a second wheel N and N', which is formed of sheet metal cut on its outer edge into notches with rectangular sides, which projecting points are bent to right angles to form plain surfaces surrounding and inclosing the periphery of the wheels M and M', and on the outer surface of which the multiple numbers may be marked. These projections are so disposed that when the wheels are at rest they shall lie between the serial numbers marked on the peripheries of the wheels M and M', so that as these numbers are seen in looking at the register the serial and the multiple numbers shall be seen alternately. The companion wheels M and N or N' and M' are so actuated as that the second wheel N or N' shall move with a step-by-step motion, one step at each entire revolution of the first wheels M and M'. The wheels M and M' are actuated step by step by the action of the counterweighted pawls upon the teeth of the ratchet M³, so that every time an enumerating-key is depressed its corresponding wheel carrying the serial numbers shall be moved forward the space of one cog. The wheel when moved is held in place by a claw-headed detent O, which is pivoted on the bearing-rod O', passing across the machine from one arm E² to the other. These detents are duplicated (seen in Fig. 1) so that one set is provided for each of the registers. These detents are held down by springs O², which rest upon their upper surfaces with a pressure which yields to the lifting action of the inclined face of the ratchet-teeth M³, but with a pressure sufficient to hold the detents in place when in contact with the radial faces of the ratchet-teeth. The second or multiple-numbered wheels N N' are actuated in such manner that they shall move forward the distance from one of the numbered surfaces to the other at each entire revolution of the first or serial-numbered wheels M and M'. Various devices may be employed for this purpose. I have shown two organizations of mechanism by which this may be accomplished. One of the teeth of the ratchet on the wheels M and M' is elongated radially, as shown in the upper cog marked $m$ in Figs. 5, 6, and 9. An elastic spring P is attached in the manner shown in Figs. 5 and 9 to the rim of the wheels M M'. This spring presses against the inner surface of the bent ends N³ of the second or multiple-numbered wheel, and its elasticity will permit it to yield, so as to travel around with the wheel M without applying sufficient strain to the bent ends N³ to overcome the resistance of the claw on the end of the detent; but when the long cog $m$, which has a greater radial length, reaches the detent it will lift it higher than will the short cogs, and so high that the spring P, passing into the space between the bent ends N³, will have power sufficient to draw the wheel N with it until the long cog has passed the point of the detent O, when the latter will fall back into the next space between the bent ends N³ and engage with the short tooth of the ratchet M³. By this means a step-by-step movement is communicated to the wheel M or M' by each movement of a key B², and at each entire revolution of the serial-numbered wheel M the multiple-numbered wheel N will be carried forward one step.

Another means of connecting the two wheels, which may be used instead of the spring P, is as follows:

P', Figs. 6 and 7, is a rod beveled at the upper end, which passes through the peripheral flange of serial-numbered wheel M at one end and at the other through the hub of said wheel, bearing against the surface of a shaft D. This rod is held against the shaft by the coiled spring P², which rests against the flange at one end and against a pin or collar at the other, so that the expansion of the spring tends to hold the rod continually in contact with the surface of the shaft. On this shaft there is a projection D², inclined on one face and radial on the other. These are placed on top of the shaft, so that it shall lift the rod P' at the instant that the long tooth $m$ of the ratchet has lifted the detent, so that at that instant the rod shall be thrust outward until its point engages a projection $N^3$ and causes the wheel N to move with the wheel M. When it has thus been moved the space of one tooth or cog of the ratchet, the end of the rod will pass off of the projection $D^2$ and the rod will be instantly retracted by the expansion of the spring.

It is necessary that provision should be made for bringing the wheels back to the zero-point after they have been examined and the indicated result of the sales has been taken off. This is done by the following mechanism: A longitudinal groove or key-way is cut in the surface of the shafts D and D'. In these grooves a series of dogs, Fig. 10, is placed, so that the surface $r$ shall lie within the hub of the wheels M M' and the lower surface $r'$ shall rest in the central hole of the thin wheels N and N', as shown in Fig. 8. The surface of the dogs is beveled on one side and a notch is cut in each of the wheels M M' and N N' to receive the dogs. The dogs are pressed outwardly constantly by spiral springs R'. (Distinctly shown in Figs. 2, 8, and 9.) When the wheels are revolving in the normal work of the machine, as they encounter the beveled face of the dogs, they will not be disturbed in their rotation. The arrangement of the pawl F and ratchet on the shaft D' is such that when the shaft is turned by the socket-key it must be turned in the direction of the rotation of the wheels M and N. This brings the abrupt faces of the dog toward the notch, so that as soon as the portion $r$ of the dog encounters the notch in the wheel M or M' the spring R' will force the dog into the notch so as to carry the wheel with the shaft. As the lower surface of the dog $r'$ cannot enter the notch on the wheel N or N' until the dog has been lifted into the notch in the wheel M or M', it is only when the shaft carrying the wheel M or M' brings the dog into line with the notch in the wheel N or N' that the latter will be carried forward, and, as these notches are coincident with the zero upon the peripheries of the wheels, two revolutions of the shaft will bring both wheels at zero into coincidence.

The wheels M M', as represented in the drawings, are consecutively numbered. This would require the number on the wheel to be multiplied by any number on its proper key above one. This, however, is simply by way of illustration. It would be preferable to have instead, serial numbers formed by adding to the preceding number the number on the key—as, for instance, 2 4 6, &c., or 3 6 9, &c. The numbers on the second wheel are multiples of the highest number on the first or serial wheels. Indicators (shown in Figs. 1 and 4) may be attached to the keys to show to the customer the sale as registered; but as this is a common device it is not necessary to describe it.

What I claim as my invention, and desire to secure by Letters Patent, is—

1. The combination of a series of independent and adjustable registers, the numbered keys, and mechanism for bringing the registers alternately into engagement with the same set of operating-keys, substantially as set forth.

2. In combination with the independent and adjustable registers, keys B and B' for bringing the registers alternately into engagement with the operating-keys, and the operating-keys $B^2$, by which the registering-wheels are actuated, substantially as set forth.

3. In combination with the independent registers, the oscillating bars E, and the keys B and B' coupled thereto, substantially as set forth.

4. The combination of the independent registers, the oscillating bars E, the keys B and B', and the connecting-rods G and G', substantially as set forth.

5. The combination of the independent registers, the oscillating bars E, the keys B B', connected to the bars, and the pawls H and H', connected to the keys, substantially as set forth.

6. The combination of the independent and adjustable registers made up of pairs of wheels M N and M' N', pawls H H', and mechanism for bringing the pawl H and ratchets upon the wheels M and the pawls H' and the ratchets upon the wheels M' alternately into engagement, substantially as set forth.

7. In a register, the combination of two registering-wheels M N, one cast with a peripheral flange and the other formed of a thin plate with lateral projections upon its periphery inclosing the flange of the former, substantially as set forth.

8. The combination of the serial-numbered wheel M, having ratchet-teeth $M^3$, the multiple-numbered wheel N, having projections $N^3$, inclosing the former wheel, the detent O, engaging both wheels, and means for lifting the detent out of engagement with both wheels on the completion of a revolution by the former, so that the latter may be moved forward one step, substantially as set forth.

9. In combination with the wheels M, the wheel N, the rim of which surrounds the former, and an engaging device D, carried with the former, which, projecting outwardly, engages the latter periodically, and after moving it forward one step releases it, substantially as set forth.

In testimony whereof I have hereunto set my hand in the presence of two subscribing witnesses.

HENRY C. STILWELL.

Witnesses:
 R. MASON,
 E. R. STILWELL.